United States Patent [19]
Tomita

[11] Patent Number: 5,354,516
[45] Date of Patent: Oct. 11, 1994

[54] GAS FEEDER

[75] Inventor: Munenori Tomita, Annaka, Japan

[73] Assignee: Shin-Etsu Handotai Co., Ltd., Tokyo, Japan

[21] Appl. No.: 30,864

[22] Filed: Mar. 12, 1993

[30] Foreign Application Priority Data

May 28, 1992 [JP] Japan .................................. 4-162225

[51] Int. Cl.⁵ ............................................. B01F 3/04
[52] U.S. Cl. ................................ 261/121.1; 118/712; 118/708
[58] Field of Search ....................... 118/708, 712, 726; 261/52, 64.1, 121.1

[56] References Cited

U.S. PATENT DOCUMENTS 4,276,243  6/1981  Partus ........................... 261/121.1 X
4,436,674  3/1984  McMeramin ................... 118/726 X

*Primary Examiner*—Tim Miles
*Attorney, Agent, or Firm*—Oliff & Berridge

[57] ABSTRACT

A gas feeder for feeding a gas is disclosed. The gas feeder comprises a bubbler holding a source liquid and passing a carrier gas through the liquid, a first sensor provided upstream of the bubbler, sensing the volumetric flow of the carrier gas and producing a carrier gas flow signal, a second sensor provided downstream of the bubbler, sensing the volumetric flow of the mixture and producing a gas mixture flow signal, a valve provided downstream of the bubbler and controlling the volumetric flow of the mixture, and a computer. The computer computes the concentration of the source gas from the carrier gas flow signal and the gas mixture flow signal and estimates the mass flow of the source gas from a product of the computed concentration of the source gas and the volumetric flow of the carrier gas. The computer controls the valve in response to a difference from a predetermined mass flow and the estimated mass flow of the source gas to fix the mass flow of the source gas fed to a destination to the predetermined mass flow. The gas feeder accurately feedback controls an actual mass flow of the source gas to the fixed value without a substantial delay and is applicable to a chemical vapor deposition of single crystal layer.

9 Claims, 2 Drawing Sheets

GAS FEEDER

BACKGROUND OF THE INVENTION

1. Field of the Invention

The present invention relates to a gas feeder for feeding a fixed mass flow of a source gas used, e.g., in a CVD (chemical vapor deposition) process.

2. Description of the Related Art

In a process of growing a thin single crystal layer, e.g., of a semiconductor, the CVD process is employed. In the CVD process, a source gas is fed as a raw material for a single crystal layer deposited by a chemical reaction on the surface of a substrate. In comparison with other processes, the CVD process is characterized in that it is easy to add an impurity to the single crystal layer during formation of the layer, a less amount of an unnecessary impurity contaminates the layer and a step coverage characteristic is good. Therefore the CVD process is often employed, especially, in the production of semiconductor wafers. However, the CVD process has a technological disadvantage that a predetermined thickness of a layer cannot be obtained unless the flow of the source gas is accurately controlled during formation of the layer.

FIG. 2 illustrates a prior art gas feeder 21 for use in the CVD process. The carrier gas from a carrier gas feeder (not shown) passes through an input gas pipe 22, a mass flow sensor 23, a flow control valve 24 and a ratio detector 25 in the order mention into a source liquid 27 which is held in an agitator or bubbler 26. A mixture of a source gas and the carrier gas is prepared by mixing the carrier gas with the source liquid 27 and vaporizing same in the agitator 26 and goes out through an output gas pipe 28 equipped to the agitator 26. The gas mixture passes through the output gas pipe 28 and the ratio detector 25 to a CVD furnace (not shown).

A process computer system 29 regulates volumetric flow (i.e. volumetric flow per unit time) of the source gas of the gas mixture to a fixed value. Operator determines the flow of the source gas using a potentiometer 30. The mass flow sensor 23 senses the flow of the carrier gas passing through the input gas pipe 22 and sends a flow output signal to an arithmetic circuit or CPU 31. The ratio detector 25 detects concentration of the gas mixture passed through the output gas pipe 28 and sends a concentration output signal to the CPU 31. The CPU 31 computes the flow of the source gas in response to the flow output signal from the mass flow sensor 23 and to the concentration output signal from the ratio detector 25. A control circuit 32 receives a set-flow signal from the potentiometer 30 and a computation output signal from the CPU 31 and outputs a control signal to the flow control valve 24 in response to a difference from the set-flow signal and the computation output signal. The control circuit 32 controls the degree of opening of the flow control valve 24 in response to the difference from the set-flow signal and the computation output signal to control volumetric flow of the source gas fed to the CVD furnace so as to fix mass flow of source gas.

The gas feeder 21 controls volumetric flow of the source gas instead of mass flow of the source gas from the following causes: In essence, it would be preferable to directly control mass flow itself of the source gas fed to the CVD furnace. However, it is difficult to directly control mass flow itself of the source gas because of the state of being gas. Therefore the gas feeder 21 controls volumetric flow of the carrier gas to fix mass flow of source gas, assuming that mass flow of the source gas is approximate to volumetric flow thereof.

As shown in FIG. 2, a display 33 indicates volumetric flow of the carrier gas, concentration of the gas mixture and volumetric flow of source gas.

The prior art gas feeder 21 has the following drawback: Since the flow control valve 24 provided on the input side of the agitator 26 directly controls volumetric flow of the carrier gas to indirectly control volumetric flow of source gas, a time period is long in which the carrier gas passes through the input gas pipe 22 between the flow control valve 24 and the agitator 26 and the gas mixture passes through the output gas pipe 28 between the agitator 26 and the ratio detector 25. Therefore change of volumetric flow of the source gas in response to change of volumetric flow of the carrier gas requires a prolonged time. This causes the response time of a feedback loop of the mass flow sensor 23, the ratio detector 25, the flow control valve 24, the agitator 26 and the process computer system 29 to be prolonged, so that control of mass flow of the source gas is unstable and mass flow of the source gas fed to the CVD furnace highly is changed. Therefore it is difficult to accurately control the thickness of a layer deposited on a substrate in the CVD furnace.

In a method of controlling volumetric flow of only source gas, the pressure, the temperature and the volume of residual source liquid in the agitator during agitation, cause an actual mass flow of the source gas to differ from mass flow of the source gas estimated from volumetric flow of source gas. Therefore it is difficult to accurately control mass flow of the source gas fed to the CVD furnace.

A control method in which a gravimeter or the like measures the weight of source liquid to determine the actual mass flow of the source gas fed to the CVD furnace requires a long time to a time at which actual mass flow of the source gas reaches a predetermined value. Thus this method cannot accurately control mass flow of source gas.

SUMMARY OF THE INVENTION

Therefore, an object of the present invention is to provide a gas feeder which can accurately control mass flow of source gas as a per unit time fed to a destination to a fixed value without a substantial delay.

In order to achieve this object, a gas feeder of a first aspect of the present invention comprises a bubbler holding a source liquid and passing a carrier gas through the source liquid to bubble the source liquid to produce a gas mixture of the carrier gas and a source gas derived from the source liquid, a first sensor sensing the flow of the carrier gas, a second sensor sensing the flow of the gas mixture and, a computer comprising means for computing the concentration of the source gas from the carrier gas flow and the gas mixture flow, the computer comprising means for producing a product of the computed concentration of the source gas and the flow of the carrier gas, the computer comprising means for computing the flow of the source gas from said product, the computer comprising means for producing a difference from a predetermined flow of the source gas and the computed flow of the source gas, and means for controlling the flow of the gas mixture in response to said defference to fix the flow of the source gas fed to a destination to the predetermined flow.

A gas feeder of a second aspect of the present invention comprises a bubbler holding a source liquid and passing a carrier gas through the source liquid to bubble the source liquid to produce a gas mixture of the carrier gas and a source gas derived from the source liquid; a first sensor provided upstream of said bubbler, said first sensor sensing the flow of the carrier gas and producing a carrier gas flow signal; a second sensor provided downstream of said bubbler, said second sensor sensing the flow of the gas mixture and producing a gas mixture flow signal; a computer comprising means for computing the concentration of the source gas from the carrier gas flow signal and the gas mixture flow signal; said computer comprising means for producing a product of the computed concentration of the source gas and the flow of the carrier gas from the carrier gas flow signal; said computer comprising means for computing the flow of the source gas from said product; said computer comprising means for producing a difference from a predetermined flow of the source gas and the computed flow of the source gas; said computer comprising means for producing a control signal in response to said difference; and means, provided downstream of said bubbler, for controlling the flow of the gas mixture in response to said control signal to fix the flow of the source gas fed to a destination to the predetermined.

The computers of the first and second aspects of the present invention may compute the concentration R of the source gas in the gas mixture from a flow of gas mixture to flow of the carrier gas ratio (FLOW RATIO) and from an empirical constant A by the following empirical equation:

$$R = A \times \log_{10}(FLOW\ RATIO).$$

The first sensor may comprise a flowmeter for determining the volumetric flow of the carrier gas. The second sensor and the controlling means may constitute a mass flow controller for fixing the mass, flow of the source gas fed to the destination.

In a chemical vapor deposition of silicon single crystal layer, the source liquid may be liquid trichlorosilane, and the source gas may be gaseous trichlorosilane, and the carrier gas may be gaseous hydrogen.

Since the controlling means provided downstream of the agitator or bubbler directly controls volumetric flow of the gas mixture fed to a CVD furnace where the present invention is applied to a CVD process of single crystal layer, the controlling means, in response to the control signal from the computer, quickly fixes mass flow of the source gas fed to the CVD furnace to the predetermined value. The computer computes concentration of the source gas of the gas mixture by the empirical formula of a high approximation, so that computed concentration of the source gas is highly approximate to actual concentration of the source gas of gas mixture. Thus it follows that the control of volumetric flow of the source gas substantially controls mass flow of source gas. Since the gas mixture flow control valve provided downstream of the agitator produces the source gas controls volumetric flow of source gas, mass flow of the source gas fed to the destination, e.g., a CVD furnace is immediately changed into the predetermined mass flow of the source gas when the degree of opening of the gas mixture flow control valve is changed. Thus the gas feeder stably operates. The gas feeder of the present invention controls substantially mass flow of the source gas by the empirical formula of the high approximation of concentration of the source gas of the gas mixture, so that it can feed a mass flow of the source gas highly approximate to the predetermined value to the destination in a shorter time than a prior art gas feeder in which a gravimeter or the like determines weight of the source liquid so as to fix actual mass flow of the source gas fed to the destination. Thus the gas feeder of the present invention can stabilize the growth rate of a single crystal layer in the thickness where the CVD furnace deposits the single crystal layer on a semiconductor substrate.

Other objects, features and advantages of the present invention will be apparent from a consideration of the following description, taken in connection with the accompanying drawing.

DETAILED DESCRIPTION OF THE PREFERRED EMBODIMENTS

Figure 1:
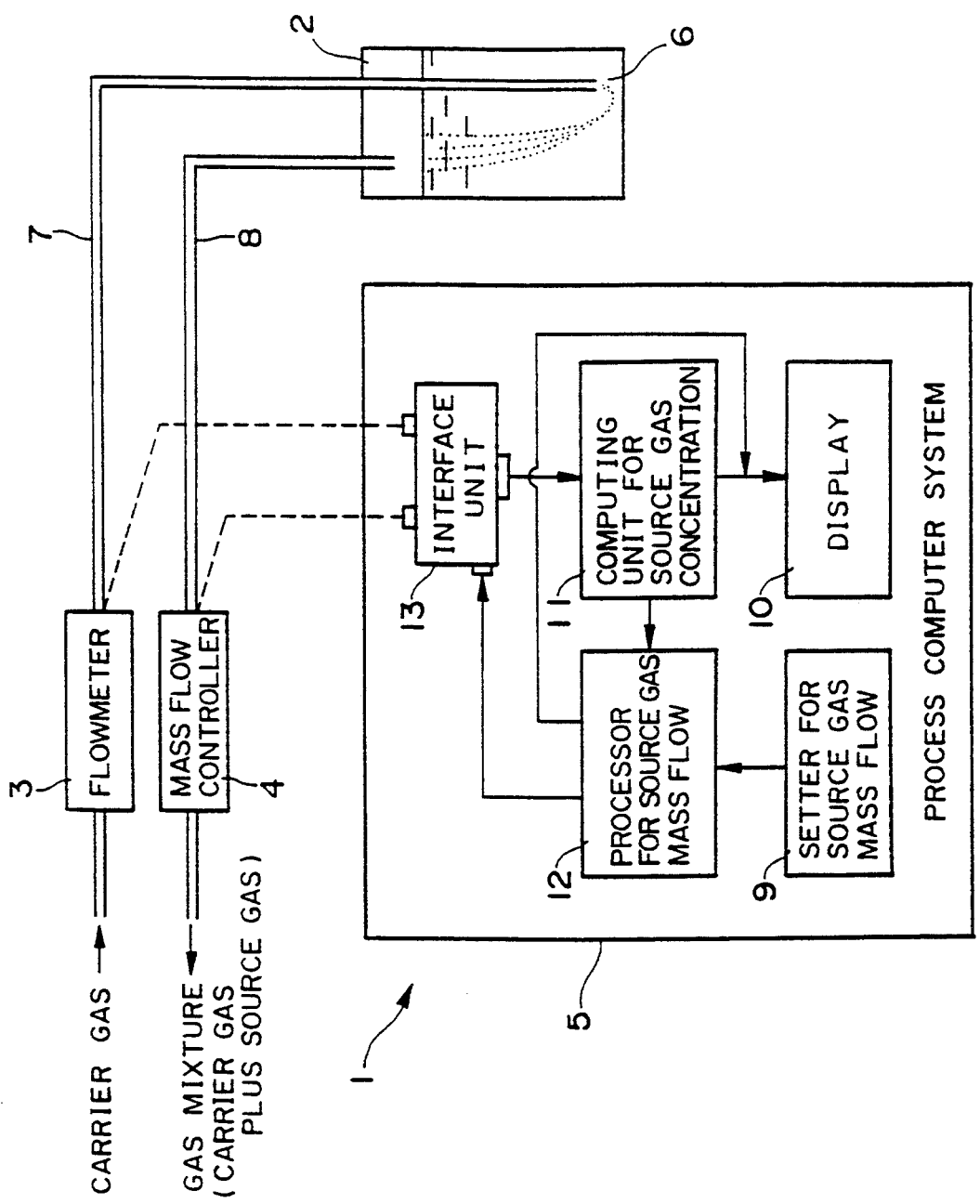
FIG. 1 is a block diagram of a gas feeder of the present invention.
Figure 2:
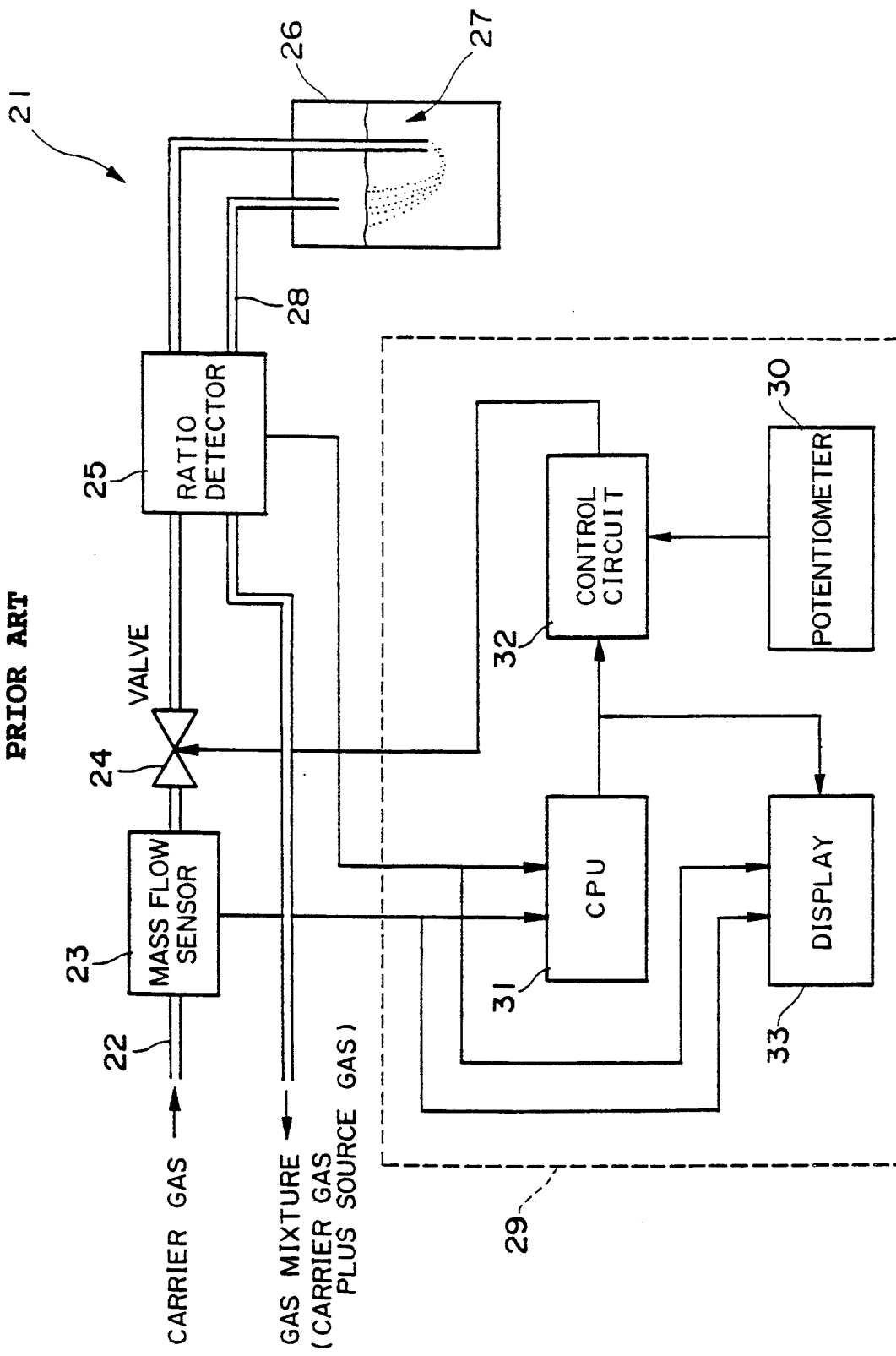
FIG. 2 is a block diagram of a prior art gas feeder.

Preferred embodiments of the present invention will be described with reference to the drawings hereinafter. As shown in FIG. 1, a gas feeder 1 comprises an agitator or bubbler 2, a flowmeter 3 for determining volumetric flow of the carrier gas, a mass flow controller 4 comprising a gas mixture volumetric flow sensor and a gas mixture volumetric flow control valve, and a process computer system 5.

The bubbler 2 is a hermetically sealed container holding a source liquid 6 and having an input gas pipe 7 and an output gas pipe 8. The input gas pipe 7 has the flowmeter 3 mounted thereintermediate. The front end or outlet of the input gas pipe 7 is immersed in source liquid 6 near the bottom of the bubbler 2. The rear or inlet of the input gas pipe 7 is connected to a carrier gas feeder (not shown), e.g., a gaseous hydrogen feeder. The output gas pipe 8 has the mass flow controller 4 mounted thereintermediate. The front end or inlet of the output gas pipe 8 is positioned above the level of source liquid 6 in the bubbler 2. The rear end or outlet of the output gas pipe 8 is connected to a CVD furnace (not shown), a destination of the gas mixture of the carrier gas and the source gas produced in the bubbler 2.

The flowmeter 3 receives the input gas pipe 7 passing therethrough and senses volumetric flow of the carrier gas. The flowmeter 3 comprises a sensor sensing volumetric flow of the carrier gas passing through the input gas pipe 7. The output terminal of this sensor is connected to an interface unit 13 of the process computer system 5.

The mass flow controller 4 receives the output gas pipe 8 passing therethrough. The mass flow controller 4 comprises a gas mixture flow control valve in the form of needle valve for controlling volumetric flow of the gas mixture and a sensor sensing volumetric flow of the gas mixture passing through the output gas pipe 8. Both the output terminal of this sensor and the input terminal of the gas mixture flow control valve are connected to the interface unit 13 of the process computer system 5.

The process computer system 5 comprises a setter for source gas mass flow 9, a display 10, a computing unit for source gas concentration 11, a processor for source gas flow 12, and the interface unit 13. The setter for source gas flow 9 determines volumetric flow of the source gas fed to the CVD furnace. The display 10 displays flows and concentrations of the source gas fed to the CVD furnace. The computing unit for source gas concentration 11 computes concentration of the source gas of the gas mixture and volumetric flow of the source gas fed to the CVD furnace. The processor for source gas mass flow 12 computes a difference from a predetermined volumetric flow of the source gas fixed by the setter for source gas mass flow 9 and from the volumetric flow of the source gas computed or estimated by the computing unit for source gas concentration 11. The processor for source gas mass flow 12 also controls degree of opening of the needle valve of the mass flow controller 4. The interface unit 13 transmits flow signals from the flowmeter 3 and the mass flow controller 4 to the computing unit for source gas concentration 11, supplies electric power to the flowmeter 3 and the mass flow controller 4, and controls the degree of opening of the needle valve of the mass flow controller 4.

In operation, the carrier gas feeder feeds the carrier gas at a fixed pressure to the bubbler 2 through the input gas pipe 7. The carrier gas from the front end of the input gas pipe 7 bubbles in the source liquid 6 in the bubbler 2 and rises therethrough. During this time, the carrier gas agitates source liquid 6 to be vaporized into source gas. Thus the gas mixture of the carrier gas and the source gas is produced. In the present embodiment of the invention, gaseous hydrogen ($H_2$) is used as the carrier gas and liquid trichlorosilane ($SiHCl_3$) is used as source liquid 6. The source gas is vaporized trichlorosilane and continues the same chemical composition. The gas mixture passes into the output gas pipe 8 through the front end thereof positioned above the level of the source liquid 6. The gas feeder 1 feeds the gas mixture to the CVD furnace through the output gas pipe and the mass flow controller 4.

The flow sensor of the flowmeter 3 senses volumetric flow of the carrier Gas passing through the input gas pipe 7 and outputs a carrier gas flow signal to the interface unit 13. The gas mixture volumetric flow sensor of the mass flow controller 4 senses volumetric flow of the gas mixture and outputs a Gas mixture flow signal to the interface unit 13.

Operation of the process computer system 5 will be described hereinafter. The computing unit for source gas concentration 11 and the display 10 receive the carrier gas flow signal and the Gas mixture flow signal through the interface unit 13. The process computer system 5 computes from volumetric flows of the carrier gas and the gas mixture as follows:

First, the process computer system 5 computes a volumetric flow of gas mixture to volumetric flow of carrier gas ratio defined as a FLOW RATIO. Second, the process computer system 5 computes concentration of the source gas by the empirical approximate expression:

$$R = A \times \log_{10}(FLOW\ RATIO)$$

where R is concentration of the source gas and A is an empirical constant. Where environmental conditions including ambient temperature and atmospheric pressure are normal and operational conditions including the pressure, the temperature and the volume of residual source liquid in the bubbler 2 and the volume of the bubbler 2 are normal, the process computer system 5 selects the value of constant A to be 85-90. In this embodiment, the process computer system 5 automatically selects predetermined values of the constant A appropriate to environmental and operational conditions. Third, the process computer system 5 computes or estimates volumetric flow of the source gas in a product of concentration of the source gas and volumetric flow of the carrier gas. The computing unit for source gas concentration 11 sends data of concentration of the source gas to the display 10. The processor for source gas mass flow 12 sends data of volumetric flow of the source gas to the display 10. The display 10 displays concentration and volumetric flow of the source gas in addition to volumetric flows of the carrier gas and gas mixture.

The processor for source gas mass flow 12 computes a difference of predetermined volumetric flow of the source gas fixed by the setter for source gas mass flow 9 and computed or estimated volumetric flow of the source gas by the computing unit for source gas concentration 11. When the difference is positive, the processor for source gas mass flow 12 causes the needle valve of the mass flow controller 4 to increase the degree of opening. On the other hand, when the difference is negative, the processor for source gas mass flow 12 causes the needle valve to reduce the degree of opening.

For controlling the degree of opening, the processor for source gas mass flow 12 outputs a control signal to the mass flow controller 4 through the interface unit 13.

Thus the feedback loop of changing volumetric flow of the source gas of the gas mixture in response to the degree of opening of the needle valve of the mass flow controller 4 is established. The feedback loop reduces the difference of the predetermined volumetric flow of the source gas of the gas mixture fixed by the setter for source gas mass flow 9 and the estimated or computed volumetric flow of the source gas by the computing unit for source gas concentration 11 to fix mass flow of the source gas fed to the CVD furnace to the predetermined value. In this embodiment, the response time of the feedback loop of the flowmeter 3, the bubbler 2, the gas mixture flow sensor, the needle valve of the mass flow controller 4 and the process computer system 5 is reduced so that change of the degree of opening of the needle valve changes volumetric flow of the source gas fed to the CVD furnace without a substantial delay. Where changes in the pressure, the temperature and the volume of residual source liquid in the bubbler 2 change the volume of vaporized source liquid 6, the process computer system 5 immediately selects a value of the constant A appropriate to a current pressure, a current temperature and/or a current volume of residual source liquid 6 in the bubbler 2. Where changes in the pressure, the temperature and the volume of residual source liquid in the bubbler 2 change the volume of vaporized liquid source, the process computer system 5 computes volumetric flow of the source gas using the constant A appropriate to the pressure, the temperature and/or the volume of residual source liquid 6 in the bubbler 2. Thus, simple control of volumetric flow of the gas mixture accurately controls mass flow of the source gas. Thus the gas feeder 1 can control mass flow of the source gas fed to the CVD furnace so that a change of mass flow of the source gas cannot affect the deposition of the thin layer on the substrate in the CVD furnace.

The present invention is not restricted to the above embodiment. The flowmeter may be in a different form in addition to the above-described form. The mass flow controller 4 may comprise a flow control valve in a different form instead of the above needle valve. The process computer system may alternatively comprise an analog circuit comprising an operational amplifier directly computing or estimating mass flow of source gas. The process computer system may alternatively comprise a digital circuit digitalizing volumetric flows of the carrier gas and the gas mixture and computing or estimating mass flow of source gas.

The gas feeder may comprise a manometer, a thermometer and a gravimeter for determining the weight of source liquid provided in the bubbler in order to automatically select a value of the constant A. In the present embodiment, the mass flow controller 4 contains the gas mixture volumetric flow sensor and the gas mixture flow control valve together. However, one of the gas mixture volumetric flow sensor and the gas mixture flow control valve or both may alternatively separately be provided outside the mass flow controller. In the present embodiment, the process computer system 5 contains the setter for source gas mass flow 9, the display 10, the computing unit for source gas concentration 11, the processor for source gas mass flow 12 and the interface unit 13. However, components of the process computer system may alternatively be provided in the flowmeter 3 and/or the mass flow controller 4 as occasion demands.

The configuration of the gas feeder may optionally changed without departing from the scope of the present invention. The present invention is not rigidly restricted to the embodiments described above. It is to be understood that a person skilled in the art can easily change and modify the present invention without departing from the scope of the invention defined in the appended claims.

What is claimed is:

1. A gas feeder, comprising:
   a bubbler holding a source liquid and passing a carrier gas through the source liquid to bubble the source liquid to produce a gas mixture of the carrier gas and a source gas derived from the source liquid;
   a first sensor sensing the flow of the carrier gas;
   a second sensor sensing the flow of the gas mixture;
   a computer comprising means for computing the concentration of the source gas from the carrier gas flow and the gas mixture flow;
   said computer comprising means for producing a product of the computed concentration of the source gas and the flow of the carrier gas;
   said computer comprising means for computing the flow of the source gas from said product;
   said computer comprising means for producing a difference from a predetermined flow of the source gas and the computed flow of the source gas; and
   means for controlling the flow of the gas mixture in response to said difference to adjust the flow of the source gas fed to a destination to the predetermined flow.

2. The gas feeder as recited in claim 1, wherein said means for controlling the flow of the gas mixture is provided downstream of said bubbler.

3. The gas feeder as recited in claim 1, wherein said means for controlling the flow of the gas mixture comprises a valve provided in the flow of the gas mixture.

4. The gas feeder as recited in claim 1, wherein the computer computes the concentration of the source gas of the gas mixture from a flow ratio, defined as a ratio of the flow of gas mixture to the flow of carrier gas, and from an empirical constant, by the following equation:

$$R = A \times \log_{10}(\text{flow ratio})$$

wherein R is the concentration of the source gas and A is said empirical constant.

5. The gas feeder as recited in claim 4, wherein said empirical constant is determined based on at least one of a pressure, temperature, and volume of the source liquid in the bubbler.

6. A gas feeder, comprising:
   a bubbler holding a source liquid and passing a carrier gas through the source liquid to bubble the source liquid to produce a gas mixture of the carrier gas and a source gas derived from the source liquid;
   a first sensor provided upstream of said bubbler, said first sensor sensing the flow of the carrier gas and producing a carrier gas flow signal;
   a second sensor provided downstream of said bubbler, said second sensor sensing the flow of the gas mixture and producing a gas mixture flow signal;
   a computer comprising means for computing the concentration of the source gas from the carrier gas flow signal and the gas mixture flow signal;
   said computer comprising means for producing a product of the computed concentration of the source gas and the flow of the carrier gas from the carrier gas flow signal;
   said computer comprising means for computing the flow of the source gas from said product;
   said computer comprising means for producing a difference from a predetermined flow of the source gas and the computed flow of the source gas;
   said computer comprising means for producing a control signal in response to said difference; and
   means, provided downstream of said bubbler, for controlling the flow of the gas mixture in response to said control signal to adjust the flow of the source gas fed to a destination to the predetermined flow.

7. The gas feeder as recited in claim 6, wherein said means for controlling the flow of the gas mixture comprises a valve provided in the flow of the gas mixture.

8. The gas feeder as recited in claim 6, wherein the computer computes the concentration of the source gas of the gas mixture from a flow ratio, defined as a ratio of the flow of gas mixture to the flow of carrier gas, and from an empirical constant, by the following equation:

$$R = A \times \log_{10}(\text{flow ratio})$$

wherein R is the concentration of the source gas and A is said empirical constant.

9. The gas feeder as recited in claim 8, wherein said empirical constant is determined based on at least one of a pressure, temperature, and volume of the source liquid in the bubbler.

* * * * *